United States Patent [19]

Bitterli et al.

[11] 3,917,641
[45] Nov. 4, 1975

[54] IMINOISOINDOLINONES

[75] Inventors: Peter Bitterli, Reinach, Basel-Land; Fritz Kehrer, Basel, both of Switzerland

[73] Assignee: Sandoz Ltd., Basel, Switzerland

[22] Filed: May 7, 1973

[21] Appl. No.: 358,003

[30] Foreign Application Priority Data
May 8, 1972 Switzerland.......................... 6814/72

[52] U.S. Cl............. 260/325; 260/37 NP; 260/37 P; 260/42.21; 106/23; 106/288 Q; 8/7

[51] Int. Cl.²....... C08D 209/50; C09D 3/727; C09D 11/00; C08J 3/20

[58] Field of Search...................... 260/325, 325 PH

[56] References Cited
UNITED STATES PATENTS

| | | | |
|---|---|---|---|
| 2,973,358 | 2/1961 | Pugin............................... | 260/325 X |
| 3,758,497 | 9/1973 | Pugin et al......................... | 260/325 |

*Primary Examiner*—Donald G. Daus
*Assistant Examiner*—Diana G. Rivers
*Attorney, Agent, or Firm*—Gerald D. Sharkin; Richard E. Vila; Joseph J. Borovian

[57] ABSTRACT

Disclosed are compounds of formula I,

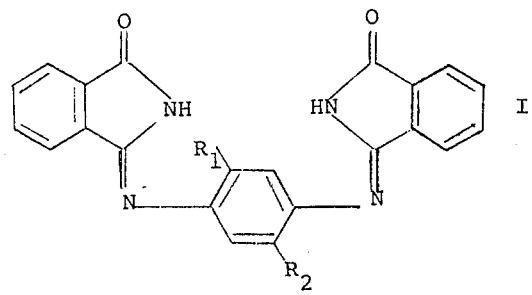

in which $R_1$ and $R_2$, which may be the same or different, each signifies a fluorine atom, a chlorine atom, a bromine atom, a methyl radical, a methoxy radical or an ethoxy radical, process for the production thereof, and use thereof as pigments for synthetic polymeric material, spun-dyed viscose and cellulose acetate filaments, paper and in surface coatings such as emulsion paints.

4 Claims, No Drawings

IMINOISOINDOLINONES

The invention concerns imino-isoindolinone compounds having low solubility in water.

The invention provides compounds of formula I,

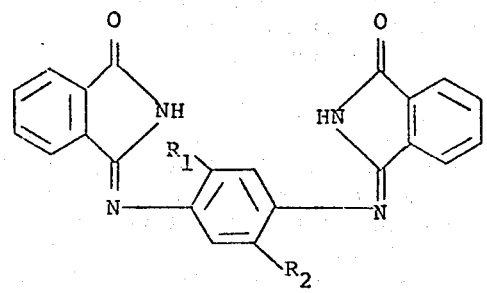

in which $R_1$ and $R_2$, which may be the same or different, each signifies a fluorine atom, a chlorine atom, a bromine atom, a methyl radical, a methoxy radical or an ethoxy radical.

The invention provides a process for the production of compounds of formula I, stated above, characterised by condensing a compound of formula II,

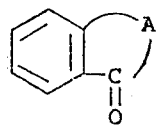

in which A signifies a structure (a)

  (a)

or a structure (b),

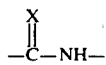  (b)

in which X signifies

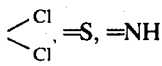

or

in which R signifies an alkyl radical, with a compound of formula III,

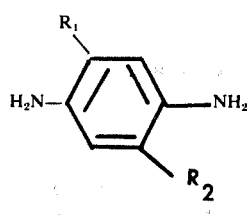 III in which $R_1$ and $R_2$ are as defined above, or with a neutral salt of the compound of formula III.

The condensation is advantageously carried out in a polar organic solvent, for example in an alcohol, alcohol ether, N-dialkylacylamide or dimethyl sulphoxide. The reaction may conveniently be carried out at a temperature of up to 200°C, preferably from 70° to 140°C. The reaction runs very smoothly when a neutral salt, for example formed from a strong acid, such as the hydrochloride or sulphate salt of the compound of formula III, is employed. Where the free diamine of formula III is employed, it is advisable to carry out the condensation in the presence of an acid, such as glacial acetic acid, which binds the ammonia liberated in the reaction. Since the condensation involves two mols of the compound of formula II to one mol of the compound of formula III, it is preferred to employ the compounds in such a mol ratio. The preferred compound of formula II is the one in which A signifies structure (b) and X signifies =NH. Where, in the compounds of formula II, A signifies structure (b) and X signifies

R preferably signifies an alkyl radical of 1 to 6, more preferably 1 to 4, carbon atoms.

The resulting compound of formula I may be isolated in conventional manner.

The compound of formula II, in which A signifies structure (a) is conveniently obtained by cleavage of hydrogen chloride, in conventional manner, from the compound of formula II in which A signifies structure (b) and X signifies

The preferred compounds of formula I are those in which $R_1$ and $R_2$, independently, each signify a chlorine or bromine atom.

The compounds of formula I are pigments. They are particularly suitable for pigmentation of synthetic polymeric materials in the mass, in the presence or absence of solvents, particularly after having been conditioned in the normal methods for pigments. By synthetic polymeric material is to be understood synthetic polymers and resins such as polyethylene, polystyrene, polyvinyl chloride, synthetic rubber latices and peromerics (synthetic leathers). The compounds are also suitable for use in emulsion paints and other surface coatings in an oil, water or solvent base, in printing inks and in viscose and cellulose acetate spinning solutions for the production of spundyed filaments. The compounds can also be used for dyeing paper in the stock prior to sheet formation and for painting and coating textiles. In the above uses, the compounds of formula I are used in conventional manner.

In the above substrates the compounds of formula I are notable for good transparency and heat stability characteristics, together with notable migration and light fastness properties and notable fastness to overspraying.

The following Examples, in which all parts and percentages are by weight and the temperatures in degrees centigrade, illustrate the invention.

EXAMPLE 1

32 Parts of 3-imino-iso-indolinone and 25 parts of 2,5-dichloro-1,4-diaminobenzene hydrochloride are dissolved in 500 parts of ortho-dichlorobenzene and reacted for 16 hours at 130°–140° with thorough stirring. A yellow precipitate forms which is filtered off at 100° with suction, washed consecutively with hot orthodichlorobenzene, methanol and water, and dried at 100°. The crude product is dissolved in a mixture of 500 parts of ethyl alcohol and 25 parts of 33 % sodium hydroxide solution at 60°. After the addition of activated carbon the solution is stirred for a short time and then filtered. The filtrate is acidified with 15 parts of acetic acid to precipitate the pigment, which is filtered off while still warm, washed with ethyl alcohol and water, and dried at 100°.

A pigment of high tinctorial strength with the formula

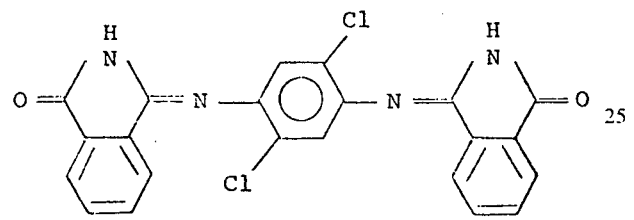

is obtained. It is eminently suitable for the pigmentation of synthetic polymers and surface coatings and is notable for very good light and migration fastness, heat stability and fastness to overspraying.

EXAMPLE 2

17.7 Parts of 2,5-dichloro-1,4-diaminobenzene are added to a solution of 35 parts of 3-chloro-1-oxoisoindolinone in 400 parts of 1,2-dichlorobenzene. The reaction mixture is heated to 150° with stirring and stirred further at this temperature until the evolution of hydrogen chloride ceases. The precipitated pigment is filtered off at 100°, washed with hot 1,2-dichlorobenzene, hot methanol and finally with water, and dried. The pigment thus obtained is identical with that described in Example 1.

In the following Table further pigments of formula

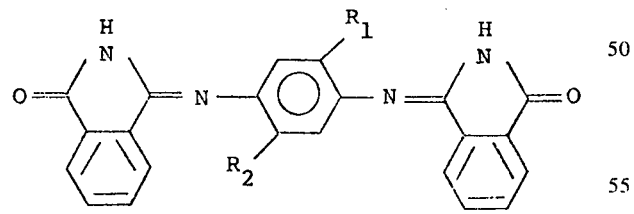

are listed which are produced in accordance with the procedure of Example 1 or 2.

Table

| Example No. | $R_1$ | $R_2$ | Shade |
|---|---|---|---|
| 3 | —CH$_3$ | —CH$_3$ | yellow |
| 4 | —Cl | —CH$_3$ | greenish yellow |
| 5 | —OCH$_3$ | —OCH$_3$ | reddish yellow |
| 6 | —OCH$_3$ | —Cl | yellow |
| 7 | —OC$_2$H$_5$ | —OC$_2$H$_5$ | reddish yellow |
| 8 | —Br | —Br | greenish yellow |
| 9 | —Br | —CH$_3$ | greenish yellow |

APPLICATION EXAMPLE 0.5 Parts of the pigment produced according to Example 1 and 5 parts of titanium dioxide white pigment are intimately mixed with 100 parts of moulding material consisting of:

- 63 parts of a polyvinyl chloride emulsion
- 32 parts of a dioctyl phthalate plasticizer
- 3 parts of a commercial epoxide plasticizer
- 1.5 parts of a commercial stabilizer (barium-cadmium complex)
- 0.5 parts of a commercial chelator.

For improved pigment distribution, the mixture is worked for 8 minutes on a roller mill set at 160°, with one roller rotating at 20 r.p.m. and the other at 25 r.p.m. to exert friction. Subsequently it is extruded as film of 0.3 mm thickness. The film is pigmented in a greenish yellow shade which has very good light and migration fastness and is heat stable.

What is claimed is:

1. A compound of formula I,

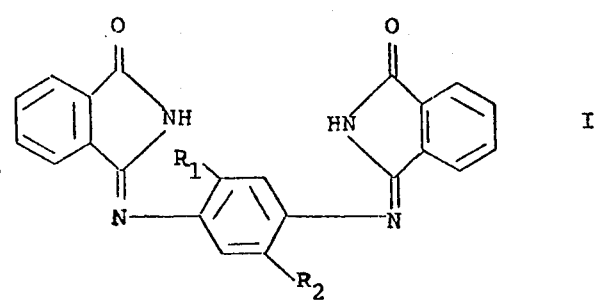

in which $R_1$ and $R_2$, which may be the same or different, each signifies a chlorine atom, a bromine atom, a methyl group, a methoxy group or an ethoxy group.

2. A compound according to claim 1, wherein $R_1$ and $R_2$, which may be the same or different, each signifies a chlorine or bromine atom.

3. A compound according to claim 2 of formula,

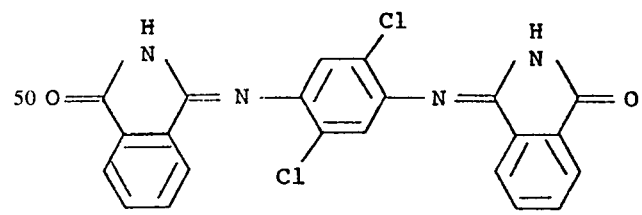

4. A compound according to claim 2 of formula,

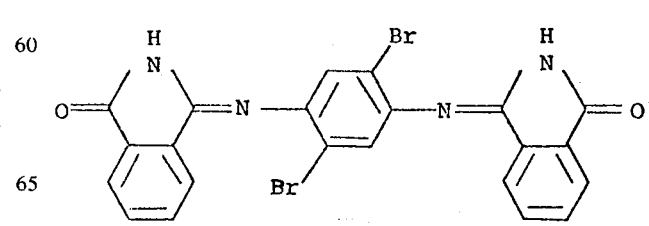

* * * * *